US012697754B2

(12) United States Patent
Fu et al.

(10) Patent No.: US 12,697,754 B2
(45) Date of Patent: Aug. 4, 2026

(54) METHOD OF RECYCLING FIBERS FROM POST-CONSUMER NYLON FABRICS

(71) Applicant: Fujian Eversun Jinjiang Co., Ltd., Fuzhou (CN)

(72) Inventors: Zhongxian Fu, Fuzhou (CN); Ming Li, Fuzhou (CN); Feng Lu, Fuzhou (CN); Xianjie Wang, Fuzhou (CN); Guoqin Huang, Fuzhou (CN); Jianbin Zheng, Fuzhou (CN); Yunyun Wan, Fuzhou (CN)

(73) Assignee: Fujian Eversun Jinjiang Co., Ltd., Fuzhou (CN)

( * ) Notice: Subject to any disclaimer, the term of this patent is extended or adjusted under 35 U.S.C. 154(b) by 509 days.

(21) Appl. No.: 18/467,638

(22) Filed: Sep. 14, 2023

(65) Prior Publication Data

US 2024/0001593 A1     Jan. 4, 2024

(30) Foreign Application Priority Data

Jun. 30, 2023    (CN) .......................... 202310796676.5

(51) Int. Cl.
B29B 17/04        (2006.01)
D01D 5/34         (2006.01)

(52) U.S. Cl.
CPC .............. B29B 17/04 (2013.01); D01D 5/34 (2013.01); *B29B 2017/0468* (2013.01); *D10B 2331/02* (2013.01)

(58) Field of Classification Search
CPC ............ B29B 17/04; B29B 2017/0468; B29B 17/0042; D01D 5/34; D10B 2331/02; B29K 2077/00; B29L 2031/726; D01F 6/60; D01F 8/12; Y02W 30/62
See application file for complete search history.

(56) References Cited

U.S. PATENT DOCUMENTS 3,958,066 A * 5/1976 Imamura ................ D06M 11/55
427/205

FOREIGN PATENT DOCUMENTS

CN      102675627 A    9/2012
CN      114591531 A    6/2022
KR  20170011250 A  *  2/2017

* cited by examiner

*Primary Examiner* — Elizabeth M Imani

(57)        ABSTRACT

A method of recycling fibers from post-consumer nylon fabrics is performed as follows. Post-consumer nylon textiles are crushed to obtain crushed textiles, which are fed to a two-stage screw machine, and transported to a compression zone, a melting zone, and a metering zone in sequence. Then the crushed textiles are subjected to water cooling, air cooling, granulation and drying to obtain nylon fabric chips, which are subjected to secondary granulation. The nylon fabric chips and a nylon-6 masterbatch are fed into a composite core screw and a skin screw to obtain a mixed melt, which is fed into a spinning box and compounded to obtain a coated filament bundle. The coated filament bundle is ejected for monomer suction, and subjected to primary cooling by lateral blowing, cluster oiling, secondary cooling, stretched shaping and winding to obtain recycled fibers.

9 Claims, 2 Drawing Sheets

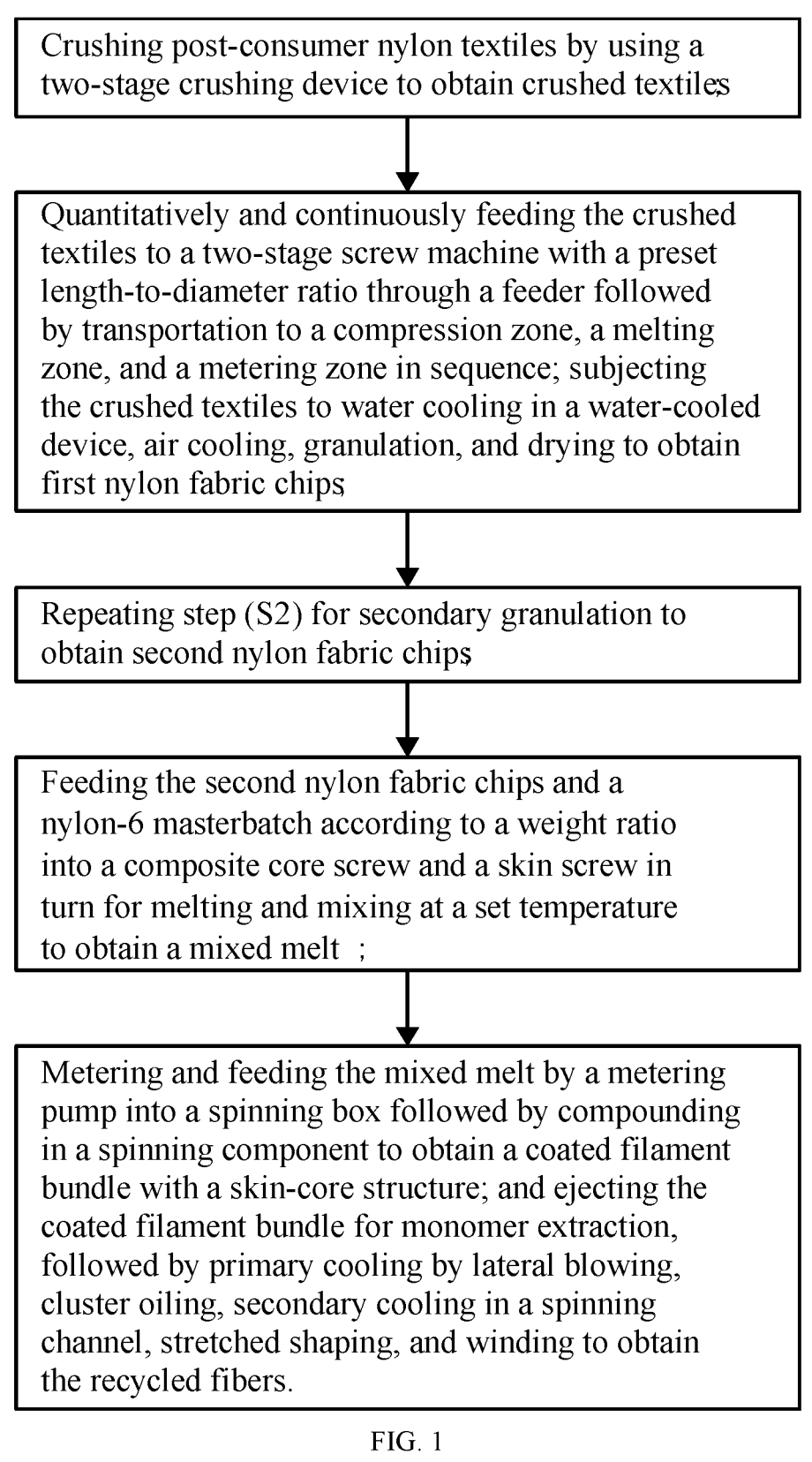

Crushing post-consumer nylon textiles by using a two-stage crushing device to obtain crushed textiles Quantitatively and continuously feeding the crushed textiles to a two-stage screw machine with a preset length-to-diameter ratio through a feeder followed by transportation to a compression zone, a melting zone, and a metering zone in sequence; subjecting the crushed textiles to water cooling in a water-cooled device, air cooling, granulation, and drying to obtain first nylon fabric chips Repeating step (S2) for secondary granulation to obtain second nylon fabric chips Feeding the second nylon fabric chips and a nylon-6 masterbatch according to a weight ratio into a composite core screw and a skin screw in turn for melting and mixing at a set temperature to obtain a mixed melt ;

Metering and feeding the mixed melt by a metering pump into a spinning box followed by compounding in a spinning component to obtain a coated filament bundle with a skin-core structure; and ejecting the coated filament bundle for monomer extraction, followed by primary cooling by lateral blowing, cluster oiling, secondary cooling in a spinning channel, stretched shaping, and winding to obtain the recycled fibers.

FIG. 1

METHOD OF RECYCLING FIBERS FROM POST-CONSUMER NYLON FABRICS

CROSS-REFERENCE TO RELATED APPLICATIONS

This application claims the benefit of priority from Chinese Patent Application No. 202310796676.5, filed on Jun. 30, 2023. The content of the aforementioned application, including any intervening amendments thereto, is incorporated herein by reference in its entirety.

TECHNICAL FIELD

This application relates to recycling of nylon fabrics, and more particularly to a method of recycling fibers from post-consumer nylon fabrics.

BACKGROUND

With the social progress and development, increasingly growing requirements have been put forward for the environmental protection. In the "Two Sessions" (namely, National People's Congress and Chinese People's Political Consultative Conference), "Green & Low-carbon" has become a hot spot, and "promoting the green transformation of development" and "steadily advancing the energy saving and carbon reduction" have been proposed. With regard to the textile and chemical fiber industry, how to reduce the impact of chemical fiber products on the environment to conform to the "Green & Low-carbon" development mainly includes "promoting the research and development of bio-based degradable materials" and "recycling chemical fiber products".

At present, the recycling operation is performed mainly for the waste yarn produced in the production process of nylon filament and stretch yarn. A relatively large number of defective products and low-grade products will occur during the back-end processing of nylon fabrics. The conventional chemical recycling of nylon fabrics will cause serious environment pollution. How to eco-friendly recycle and reuse the end product has become a challenge for researchers in the textile industry. Considering the presence of a variety of components in the end product, the conventional process cannot realize the differential recycling. The present application can realize undamaged recovery and recycling of post-consumer nylon fabrics.

SUMMARY

An object of the present application is to provide a method of recycling fibers from post-consumer nylon fabrics, which can reduce the influence of other impurities in the recycled fabrics on the performance of the spun products and the subsequent dyeing, and realize the undamaged recovery and recycling of post-consumer nylon fabrics.

Technical solutions of this application are described as follows.

This application provides a method of recycling fibers from post-consumer nylon fabrics, comprising:

(S1) crushing a post-consumer nylon textile by using a two-stage crushing device to obtain crushed textiles;

(S2) quantitatively and continuously feeding the crushed textiles to a two-stage screw machine with a preset length-to-diameter ratio through a feeder; transporting the crushed textiles to a compression zone, a melting zone, and a metering zone in sequence; and subjecting the crushed textiles to water cooling in a water-cooled device, air cooling, granulation, and drying to obtain first nylon fabric chips;

(S3) repeating step (S2) to perform secondary granulation on the first nylon fabric chips to obtain second nylon fabric chips;

(S4) feeding the second nylon fabric chips and a nylon-6 masterbatch according to a weight ratio into a composite core-skin screw for melting and mixing at a preset temperature to obtain a mixed melt; and (S5) metering and feeding, by a metering pump, the mixed melt into a spinning box followed by compounding in a spinning component to obtain a coated filament bundle with a skin-core structure; and ejecting the coated filament bundle through a slow-cooling heating zone for monomer suction followed by primary cooling by lateral blowing, cluster oiling, secondary cooling in a spinning channel, stretching and shaping, and winding to obtain the recycled fibers.

In an embodiment, the two-stage crushing device comprises a first-stage unit and a second-stage unit; the first-stage unit is a shear shredder with an inlet length of 254 mm, an inlet width of 600 mm, and a knife diameter of 220 mm; and the second-stage unit is a dual-shaft shear shredder with an inlet length of 305 mm, an inlet width of 400 mm, and a knife diameter of 410 mm.

In an embodiment, in step (S2), the preset length-to-diameter ratio of the two-stage screw machine is 32-35; a melting temperature of a first-stage screw unit of the two-stage screw machine is set to 235-250° C.; and a melting temperature of a second-stage screw unit of the two-stage screw machine is set to 230-240° C.

In an embodiment, in step (S2), the drying is performed at 80-90° C. for 10-12 h.

In an embodiment, in step (S4), the weight ratio of the second nylon fabric chips to the nylon-6 masterbatch is 3:7-8:2; the second nylon fabric chips have a relative viscosity of 2.5-2.62, a melting point of 210-220° C., a water content of 400-500 ppm; and the nylon-6 masterbatch has a relative viscosity of 2.44-2.47, a water content of 320-380 ppm and a melting point of 220-225° C.

In an embodiment, in step (S4), a temperature of a core screw unit of the composite core-skin screw is 230-245° C., and a temperature of biphenyl in the core screw unit is 240-250° C.; and a temperature of a skin screw unit of the composite core-skin screw is 245-260° C., and a temperature of biphenyl in the skin screw unit is 250-260° C.

In an embodiment, in step (S5), the lateral blowing is performed at a temperature of 17-24° C., a wind speed of 0.3-0.65 m/s, and a relative humidity of 75%; an oiling agent for the cluster oiling is a spin finish with a concentration of 6%-12%; and an oil pick-up (OPU) of the coated filament bundle is kept at 0.45-0.7%.

In an embodiment, in step (S5), the spinning component is a composite plate formed by a feed plate, a guide plate, a distributor plate, and a spinneret plate; and the coated filament bundle has a concentric circle cross-section.

In an embodiment, in step (S5), a core layer of the skin-core structure is a fiber layer from the post-consumer nylon textile; a skin layer of the skin-core structure is a nylon-6 masterbatch layer; and a volume ratio of the skin layer to the core layer is 2:8-7:3.

This application has the following beneficial effects.

The length-to-diameter ratio (L/D ratio) of the two-stage screw machine (i.e., mother baby type extruder) is set such that the recycled fabrics can be fully mixed and melted in the compression zone, the melting zone, and the metering zone. The secondary granulation is used to improve the uniformity of the chips.

The moisture content can be kept in a specific range through controlling the drying temperature and time. The hot air is blown by the fan to ensure the temperature uniformity in the box and dry the chips fully, to ensure the continuity and stability of the subsequent production.

An ultra-low temperature is set in the spinning screw to recycle a small number of impurities. The coated composite structure can avoid the impact of impurities on the spinning process, to achieve undamaged recycling of fibers.

BRIEF DESCRIPTION OF THE DRAWINGS

FIG. 1 is a flow chart of fiber preparation according to an embodiment of the present disclosure.

DETAILED DESCRIPTION OF EMBODIMENTS

Figure 2:
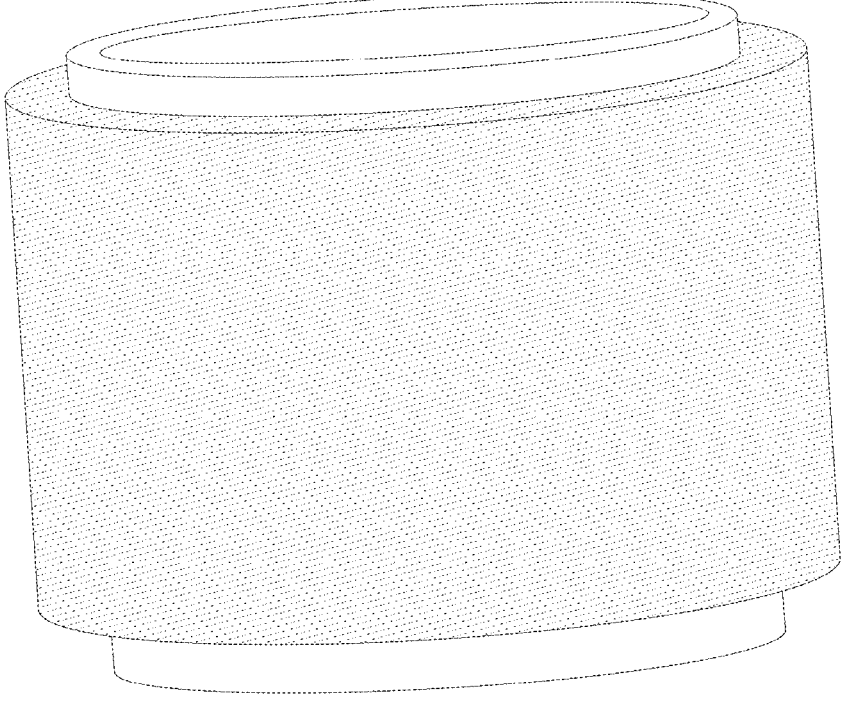
FIG. 2 shows yarns of a product prepared according to an embodiment of the present disclosure.

The present disclosure will be further described below in conjunction with the accompanying drawings.

Referring to FIGS. 1 to 2, a method of recycling fibers from the post-consumer nylon fabrics is provided, which includes the following steps.

(S1) The post-consumer nylon textiles were crushed by using a two-stage crushing device to obtain crushed textiles. The two-stage crushing device included a first-stage unit and a second-stage unit. The first-stage unit was a shear shredder 600. The second-stage unit was a dual-shaft shear shredder 400. The dual-stage crushing device was able to pulverize the post-consumer nylon textile to ensure uniformity of the raw materials.

(S2) The crushed textiles were quantitatively and continuously fed in a two-stage screw machine with a preset length-to-diameter ratio through a feeder. The crushed textiles were transported to a compression zone, a melting zone, and a metering zone in sequence. The crushed textiles are subjected to water cooling in a water-cooled device, air cooling, granulation, and drying to obtain first nylon fabric chips.

(S3) The step (S2) was repeated for secondary granulation on the first nylon fabric chips to ensure the uniformity of the raw materials to get the second nylon fabric chips. The secondary granulation step for hot melting and thermal cracking can ensure that the raw materials were uniform to obtain second nylon fabric chips.

(S4) The second nylon fabric chips and nylon-6 masterbatch according to a weight ratio was fed into a composite core-skin screw for melting and mixing at a preset temperature to obtain a mixed melt.

(S5) After the mixed melt was metered and fed by a metering pump into the spinning box, the mixed melt metered was compounded in the spinning component to obtain a coated filament bundle with a skin-core structure. The coated filament bundle was ejected through a slow-cooling heating zone for monomer suction followed by primary cooling by lateral blowing, cluster oiling, secondary cooling in a spinning channel, stretching and shaping, and winding to obtain the recycled fibers. The secondary cooling in the spinning channel was the natural air cooling.

After the post-consumer nylon textiles were deeply crushed to obtain the crushed textiles, the crushed textiles were fed into the two-stage screw machine with the preset length-to-diameter ratio. The crushed textiles were transported to the compression zone, the melting zone, and the metering zone for the first time followed by subjecting extrusion granulation, drying, and secondary thermal melt cracking to ensure the raw materials uniform to get the second nylon fabric chips. In the step (S3), the number of times to repeat step (S2) depended on the actual situation. When subjecting granulation for the first time, the particle size may be nonuniform, and the masterbatch may contain impurities. The secondary granulation improved the uniformity of the masterbatch to ensure that the subsequent spinning process of the melt fluidity was smooth to ensure the continuity of production.

The obtained second nylon fabric chips and conventional nylon-6 masterbatch were respectively fed into the composite core screw and the skin screw for melting, metering, and compositing to obtain the mixed melt. Then the mixed melt was ejected in the slow-cooling heating zone to form the filament bundles followed by performing oiling, stretching, shaping, and winding to obtain the recycled fibers. The present disclosure obtained uniform spinning raw materials through the differential baby-mother screw machine and online-drying equipment and drying process. The present disclosure also set special spinning parameters to prepare continuously the recycled fibers by two polymers along the longitudinal direction of the fibers, reduced the influence of other impurities on recycled fabrics on the properties of spun products and the subsequent dyeing, to achieve undamaged recycling and reuse of post-consumer nylon fabrics.

Referring to FIGS. 1 to 2 again, the two-stage crushing device includes the first-stage unit and the second-stage unit. The first-stage unit is a shear shredder with an inlet length of 254 mm, an inlet width of 600 mm, and a knife diameter of 220 mm, which roughly crushed the raw material to solve the problem that high elasticity raw material entangled the rotor. The second-stage unit is a dual-shaft shear shredder with an inlet length of 305 mm, an inlet width of 400 mm, and a knife diameter of 410 mm, which performed the second crushing on the roughly-crushed raw materials to satisfy the requirements of the backend production. The post-consumer nylon textiles were crushed using the two-stage crusher to ensure uniformity of the raw materials.

Referring to FIGS. 1 to 2, in step (S2), the preset length-to-diameter ratio of the two-stage screw machine (mother-baby screw machine) was set to 32-35. A melting temperature of a first-stage screw unit of the two-stage screw machine was set to 235-250° C., and a melting temperature of a second-stage screw unit of the two-stage screw machine was set to 230-240° C. The difference in temperature between the first-stage screw unit and the second-stage screw unit was since the low temperature during granulation facilitated subsequent cooling and air drying.

In an embodiment, in step (S2), the drying was performed at 80-90° C. for 10-12 h.

In an embodiment, in step (S4), the weight ratio of the second nylon fabric chips to the nylon-6 masterbatch was 3:7-8:2. The second nylon fabric chips has a relative viscosity of 2.5-2.62, a melting point of 210-220° C., and a water content of 400-500 ppm. The nylon-6 masterbatch has a relative viscosity 2.44-2.47, a water content of was 320-380 ppm, and a melting point of 220-225° C.

In an embodiment, in step (S4), a temperature of a core screw unit of the composite core-skin screw was 230-245° C., and a temperature of biphenyl in the core screw unit was 240-250° C. A temperature of a skin screw unit of the composite core-skin screw was 245-260° C., and a temperature of biphenyl in the skin screw unit was 250-260° C. By means of the differentiated ultra-low temperature between core and skin screw units, the composite screw was suitable for recycling fabrics containing impurities, and can reduce the electrical energy consumption and avoiding affecting the dyeing performance of the products.

In an embodiment, in step (S5), the lateral blowing was performed at a temperature of 17-24° C., a wind speed of 0.3-0.65 m/s, and a relative humidity of 75%. An oiling agent for the cluster oiling was an A208 spin finish with a concentration of 6%-12%.

An oil pick-up (OPU) of the coated filament bundle was kept at 0.45-0.7%. In an embodiment, in step (S5), the spinning component was a composite plate formed by a feed plate, a guide plate, a distributor plate, and a spinneret plate. The coated filament bundle has a concentric circle cross-section.

In an embodiment, in step (S5), a core layer of the skin-core structure was a fiber layer from the post-consumer nylon textile, and a skin layer of the skin-core structure was a nylon-6 masterbatch layer. A volume ratio of the skin layer to the core layer was 2:8-7:3.

The recycled fibers prepared by the present disclosure had small differences in strength and elongation, and had no abnormalities in dyeing. Taking a skin-to-core ratio of 5:5 and a skin-to-core ratio of 3:7 as examples, and the physical properties of the recycled fibers were shown in Table 1 below.

(S4) feeding the second nylon fabric chips and a polyamide-6 masterbatch according to a weight ratio respectively into a composite core-skin screw for melting and mixing at a preset temperature to obtain a mixed melt; and (S5) metering and feeding, by a metering pump, the mixed melt into a spinning box followed by compounding in a spinning component to obtain a coated filament bundle with a skin-core structure; and ejecting the coated filament bundle through a slow-cooling heating zone for monomer suction followed by primary cooling by lateral blowing, cluster oiling, secondary cooling in a spinning channel, stretching and shaping, and winding to obtain the recycled fibers.

2. The method of claim 1, wherein the two-stage crushing device comprises a first-stage unit and a second-stage unit; the first-stage unit is a shear shredder with an inlet length of 254 mm, an inlet width of 600 mm, and a knife diameter of 220 mm; and the second-stage unit is a dual-shaft shear shredder with an inlet length of 305 mm, an inlet width of 400 mm, and a knife diameter of 410 mm.

3. The method of claim 1, wherein in step (S2), the preset length-to-diameter ratio of the two-stage screw machine is 32-35; a melting temperature of a first-stage screw unit of the two-stage screw machine is set to 235-250° C.; and a melting temperature of a second-stage screw unit of the two-stage screw machine is set to 230-240° C.

TABLE 1

| | Physical properties of the recycled fibers | | | | | | | | |
|---|---|---|---|---|---|---|---|---|---|
| | Degree of fineness | | Breaking strength/ Coefficient of variation | | Elongation at break | | Yarn irregularity | | Hot-shrinkage rate |
| No. | dtex | CV % | cN/dtex | CV % | % | CV % | CV % | U % | % |
| Normal chip | 41.35 | 0.33 | 4.12 | 4.21 | 71.98 | 4.01 | 0.93 | 0.70 | 9.09 |
| Skin-core 5:5 | 41.33 | 0.36 | 3.88 | 2.29 | 68.16 | 2.93 | 1.36 | 1.05 | 9.19 |
| Skin-core 3:7 | 40.50 | 0.31 | 3.64 | 3.21 | 66.25 | 3.13 | 1.38 | 1.07 | 9.23 |

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A method of recycling fibers from post-consumer nylon fabrics, comprising:

(S1) crushing a post-consumer nylon textile by using a two-stage crushing device to obtain crushed textiles;

(S2) quantitatively and continuously feeding the crushed textiles to a two-stage screw machine with a preset length-to-diameter ratio through a feeder; transporting the crushed textiles to a compression zone, a melting zone, and a metering zone in sequence; and subjecting the crushed textiles to water cooling in a water-cooled device, air cooling, granulation, and drying to obtain first nylon fabric chips;

(S3) repeating step (S2) to perform secondary granulation on the first nylon fabric chips to obtain second nylon fabric chips;

4. The method of claim 1, wherein in step (S2), the drying is performed at 80-90° C. for 10-12 h.

5. The method of claim 1, wherein in step (S4), the weight ratio of the second nylon fabric chips to the nylon-6 masterbatch is 3:7-8:2; the second nylon fabric chips have a relative viscosity of 2.5-2.62, a melting point of 210-220° C., a water content of 400-500 ppm; and the nylon-6 masterbatch has a relative viscosity of 2.44-2.47, a water content of 320-380 ppm and a melting point of 220-225° C.

6. The method of claim 1, wherein in step (S4), a temperature of a core screw unit of the composite core-skin screw is 230-245° C., and a temperature of biphenyl in the core screw unit is 240-250° C.; and a temperature of a skin screw unit of the composite core-skin screw is 245-260° C., and a temperature of biphenyl in the skin screw unit is 250-260° C.

7. The method of claim 1, wherein in step (S5), the lateral blowing is performed at a temperature of 17-24° C., a wind speed of 0.3-0.65 m/s, and a relative humidity of 75%; an oiling agent for the cluster oiling is a spin finish with a concentration of 6%-12%; and an oil pick-up (OPU) of the coated filament bundle is kept at 0.45-0.7%.

8. The method of claim 1, wherein in step (S5), the spinning component is a composite plate formed by a feed plate, a guide plate, a distributor plate, and a spinneret plate; and the coated filament bundle has a concentric circle cross-section.

9. The method of claim 1, wherein in step (S5), a core layer of the skin-core structure is a fiber layer from the post-consumer nylon textile; a skin layer of the skin-core structure is a nylon-6 masterbatch layer; and a volume ratio of the skin layer to the core layer is 2:8-7:3.

\* \* \* \* \*